Jan. 13, 1970 H. C. SWIFT 3,489,251
DISK BRAKE WITH FRICTION PAN SUPPORT MEANS
Original Filed Jan. 6, 1967 3 Sheets-Sheet 3
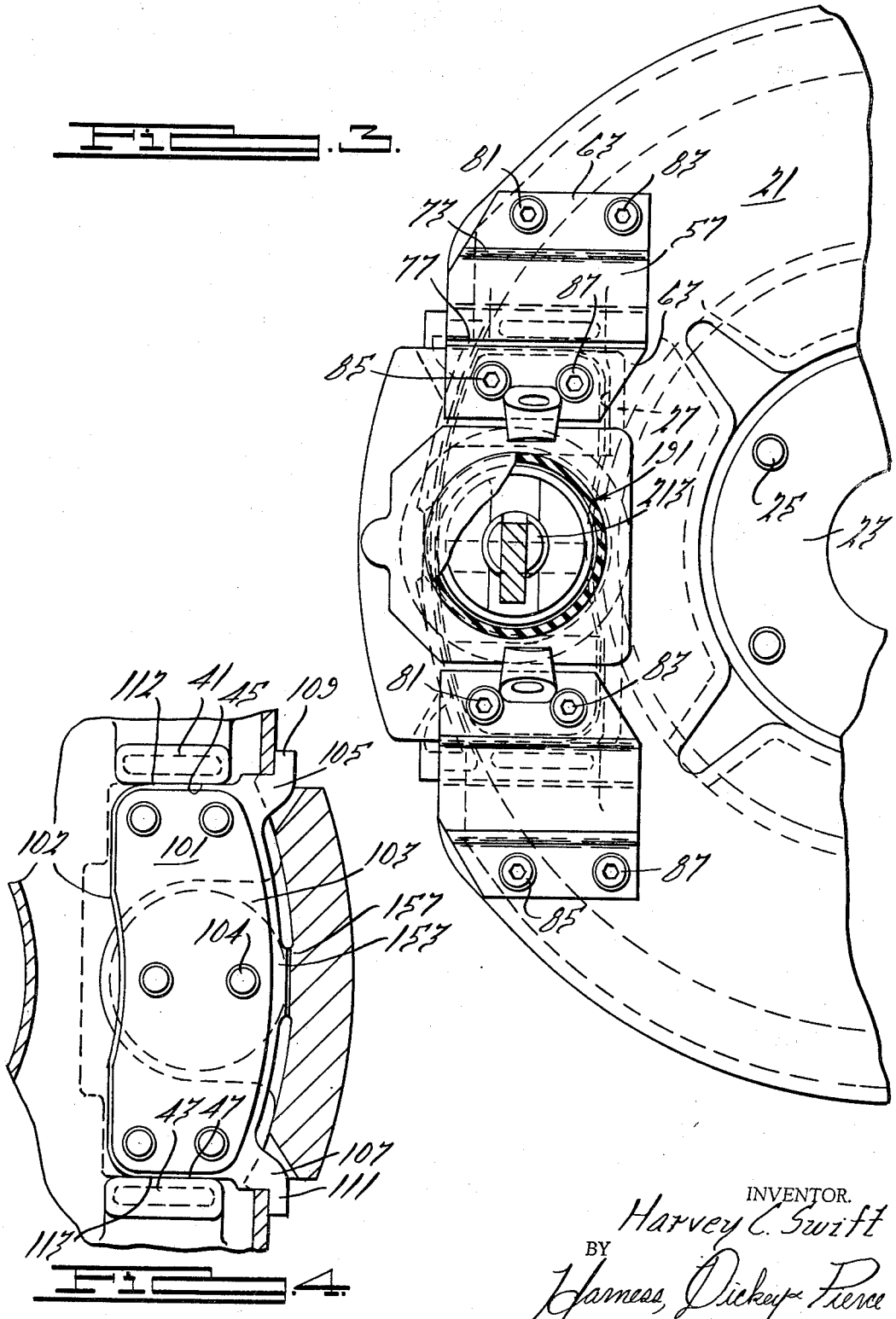
INVENTOR.
Harvey C. Swift
BY
Harness, Dickey & Pierce
ATTORNEYS United States Patent Office
3,489,251
Patented Jan. 13, 1970

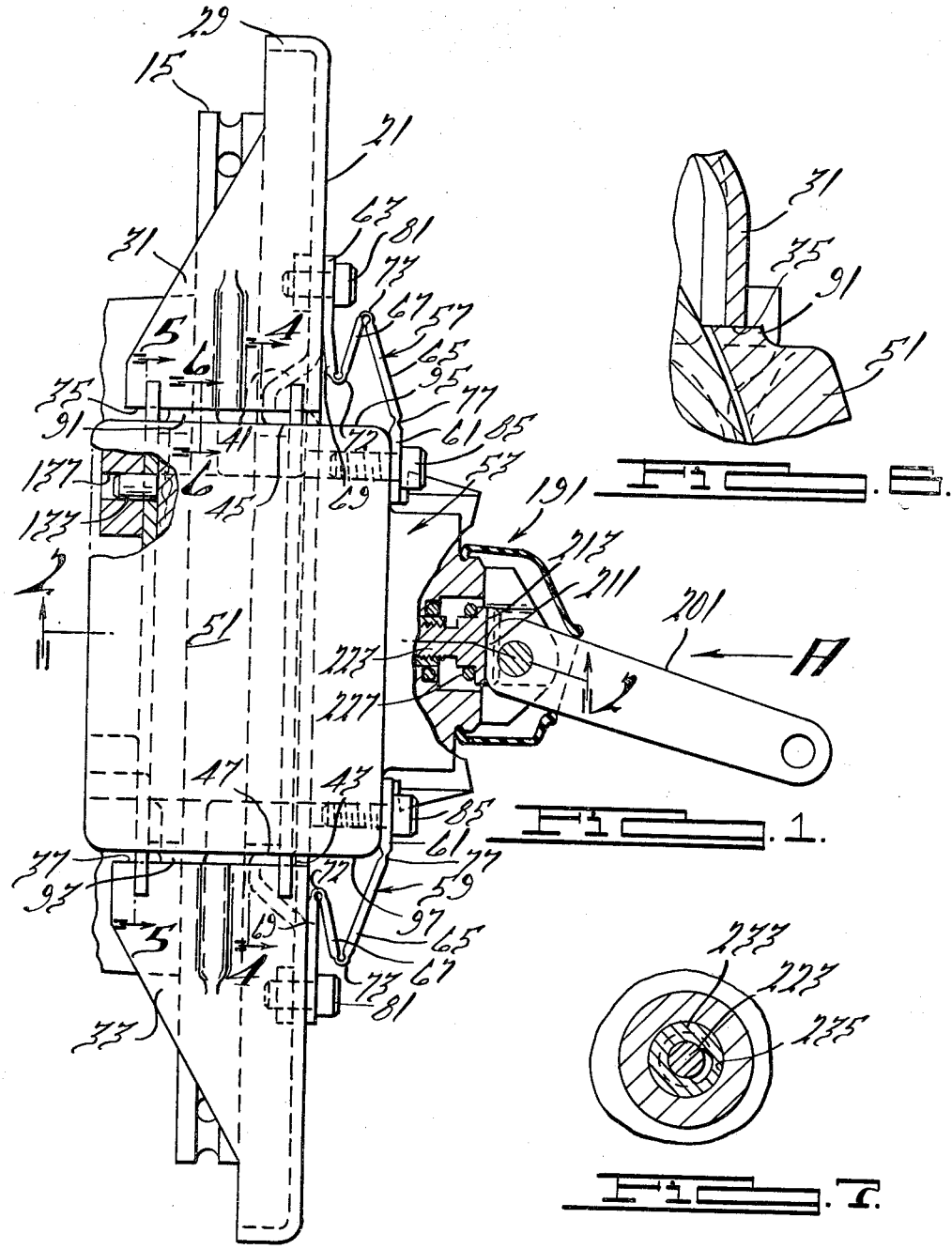

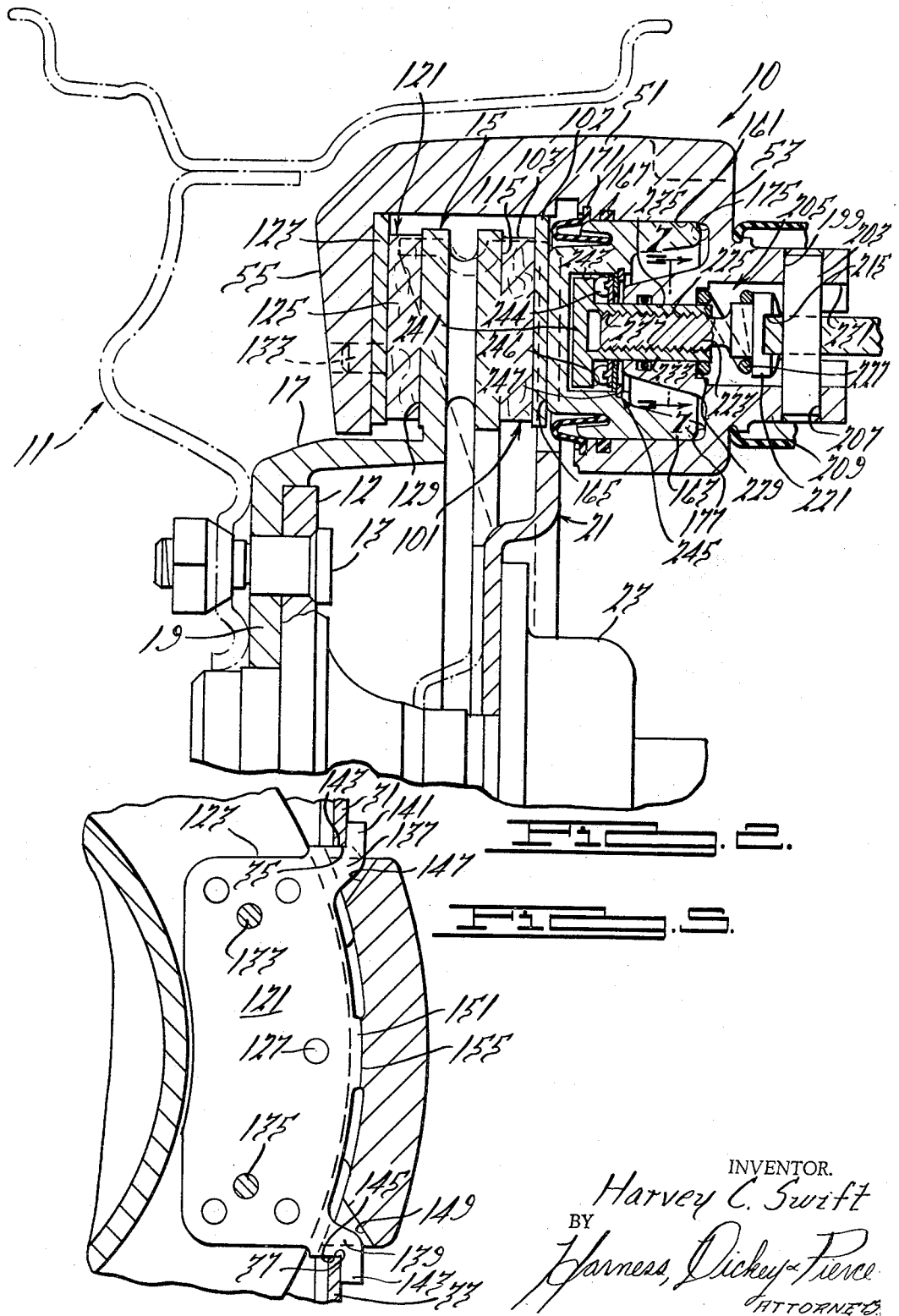

3,489,251
DISK BRAKE WITH FRICTION PAD SUPPORT MEANS
Harvey C. Swift, Birmingham, Mich., assignor to Kelsey-Hayes Company, Romulus, Mich., a corporation of Delaware
Original application Jan. 6, 1967, Ser. No. 607,683. Divided and this application Mar. 29, 1968, Ser. No. 742,104
Int. Cl. F16d 55/00
U.S. Cl. 188—73                                          7 Claims

ABSTRACT OF THE DISCLOSURE

A disk brake of the sliding caliper type wherein the caliper is supported for sliding movement by a pair of flexible straps that define spaced hinges. A torque plate is provided having flanges that overlie the outer periphery of the disk and which support the brake pads by means of tabs formed on the pad backing plates.

---

This application is a division of my application Ser. No. 607,683, filed Jan. 6, 1967, and now abandoned.

This invention relates to a disk brake that may be employed to brake a rotatable disk on a vehicle wheel and to such a disk brake that includes an automatic brake adjustment mechanism.

In the disk brake of the present invention, a fixed torque plate is employed to take the torque of a pair of brake shoes that are positioned on either side of a rotatable disk and that are brought into engagement therewith by means of a caliper having a fluid motor portion and a reaction portion. A portion of the torque from the brake shoe positioned adjacent the reaction portion may be taken also by the reaction portion. The caliper is supported from the fixed torque plate by means of a pair of flexible straps that have spaced hinges for permitting the caliper to move in a direction generally perpendicular of the plane of the rotatable disk.

More specifically, the two opposed brake shoes have backing plates that are supported from a torque plate having integrally formed spaced axially extending flanges. The torque from the brake shoe adjacent the fluid motor portion of the caliper may be taken by a pair of spaced shoulders formed on these inwardly extending flanges positioned on the torque plate, while the torque from the other brake shoe adjacent the reaction portion may be taken partially by these spaced shoulders and partially by means of pins that extend into the reaction portion of the caliper.

The disk brake of the present invention is also provided with a means for automatically adjusting the position of the actuating piston and the brake shoe actuated thereby to provide for automatic adjustment of the brake linings as wear occurs. This automatic adjustment feature may be provided in conjunction with a hand brake actuating mechanism for the brake shoes that moves the actuating piston to engage the brake shoe to be motivated thereby into engagement with one face of a rotary disk to be braked. This automatic adjustment feature comprises a threaded stud that is movable axially by a lever operated by the vehicle operator. A threaded sleeve having a head portion is engageable with the stud and it is coupled to the actuating piston by an antifriction means that includes means for moving this sleeve axially as the piston is actuated. This threaded sleeve with the head portion thereon therefore automatically follows the actuating piston and provides a means for maintaining the piston in the proper relationship with the brake shoe to be actuated thereby as the brake lining wears.

An object of the invention is the provision of an inexpensive and uncomplicated disk brake having an uncomplicated structure for suspending the caliper from a fixed torque plate and for supporting a pair of spaced brake shoes for axial sliding movement as the hydraulic piston of the disk brake is actuated.

A further object of the invention is the provision of an uncomplicated and simplified automatic brake adjustment means that automatically compensates for wear of the linings of the brake shoes during braking operations.

Other objects and attendant advantages of the present invention may be more readily realized as the specification is considered in connection with the attached drawings in which:

FIGURE 1 is a top elevational view of the disk brake of the present invention;

FIG. 2 is a sectional view taken along the lines 2—2 of FIG. 1;

FIG. 3 is a rear view partially in section, taken in the direction of the arrow A;

FIG. 4 is a sectional view taken along the lines 4—4 of FIG. 1;

FIG. 5 is a sectional view taken along the lines 5—5 of FIG. 1;

FIG. 6 is a sectional view taken along the lines 6—6 of FIG. 1; and

FIG. 7 is a sectional view taken along the lines 7—7 of FIG. 2.

Referring now to the drawings in which like reference numerals designate like parts throughout the several views thereof, a disk brake 10 is shown associated with a vehicle wheel body 11 secured to an axle flange 12 by means of nut and bolt assemblies, one of which is shown at 13. A rotatable disk 15 is also secured to the attaching flange 12 by means of nut and bolt assemblies 13 and this is done through a laterally or axially offset connecting flange 17 that connects the rotatable disk 15 with a radially extending flange 19.

A generally circular or annular stationary torque taking member or plate 21 is secured to a stationary hub 23 by any suitable means, for example, rivets 25 and this torque plate 21 has a chordally extending recess 27, as well as an outer axially extending reinforcing rib 29. A pair of spaced axially extending flanges 31 and 33 are formed integrally with the reinforcing flange 29 and they terminate in inwardly facing spaced shoulders 35 and 37 that have surfaces extending in planes generally perpendicular to the plane of rotation of the disk 15. The circular torque plate 21 also has a pair of indented shoulder portions 41 and 43 that form on their inner surfaces a pair of axially extending shoulders 45 and 47 that also extend in planes generally perpendicular to the axis of rotation of the disk 15. It can be readily appreciated from an inspection of FIG. 1 that the spaced shoulders 45 and 47 are spaced inwardly from the spaced surfaces or shoulders 35 and 37 formed on the axially extending flanges 31 and 33, respectively.

A caliper 51 having a fluid motor portion 53 and the reaction portion 55 is attached to the torque plate by a pair of flexible straps 57 and 59 that support the caliper 51 for movement in a direction generally perpendicular to the plane of rotation of the rotatable disk 15. Each of the flexible straps 57 and 59 comprises a first planar end portion 61 and a second planar end portion 63 and each has intermediate portions 65, 67 and 69 that are intercoupled by spaced hinges 71 and 73. It should be noted also that the planar fixed end portion 61 is connected to the intermediate portion 57 by a flexible hinge 77.

The end portion 63 of the flexible strap 57 is connected to the main body portion of the fixed torque plate 21 via nut and bolt assemblies 81 and 83 and the second planar nd portion 61 is connected to the fluid motor portion 53 of the caliper 51 via nut and bolt assemblies 85 and 87. The same connections are provided for the flexible strap 9. The axes of these spaced hinges are positioned to permit movement of the caliper 51 in a direction generally perpendicular to the axis of rotation of the rotatable disk 15 while simultaneously restraining movement in other directions.

The caliper 51 also has bosses 91 and 93 positioned on opposed edges 95 and 97. These bosses have edges that are positioned in engagement with the inwardly facing shoulders or edges 35 and 37 on the axially extending flanges 31 and 33, respectively, to thereby provide a space on either side of these bosses, for purposes to be later described. These two bosses 91 and 93 provide a means to prevent relative rotation between the caliper 51 and the torque plate 21 and they also provide a means to prevent twisting of the caliper 51 with respect to the torque plate 21 during braking operations that might otherwise occur and that might result in uneven wear of the brake linings.

Referring now to FIG. 4, there is shown a first brake shoe 101 having a backing plate 102 and a brake lining 103 suitably secured to the backing plate 102 by any suitable fastening means, for example, spaced rivets 104. The backing plate 102 has a pair of spaced ears 105 and 107 positioned thereon and these spaced ears have outwardly extending tabs 109 and 111 that are positioned in engagement with the axially extending flanges 31 and 33 of the torque plate 21. The backing plate 102 also has outwardly extending edges 112 and 113 that are engageable with the inwardly facing spaced shoulders 45 and 47 on the inwardly extending protuberances 41 and 43, respectively, of the torque plate 21 during braking operation or transferring the braking torque applied to the brake shoe 101 via the brake lining 103 to the stationary torque plate 21. This first brake shoe 101 is positioned so that the lining 103 is engageable with a braking face 115 of the rotor 15.

A second brake shoe 121 having a backing plate 123 and a brake lining 125 secured thereto by any suitable fastening means, for example, rivets 127 is positioned so that the brake lining 125 engages a rotor face 129 on the rotor 15. The backing plate 121 has a pair of spaced axially extending pins 133 and 135 affixed thereto and positioned adjacent either edge thereof that are positioned in complementary axially extending bores, one of which is shown at 137 in the reaction portions 55 of the caliper 51. The backing plate 123 also has spaced ears 137 and 139 positioned thereon that have outwardly extending tabs 141 and 143 positioned in engagement with the axially extending flanges 31 and 33 of the torque plate 21. The spaced ears 137 and 139 also have spaced edges 143 and 145 that engage the inwardly extending surfaces 35 and 37 on the axially extending flanges 31 and 33 to provide a means together with the axially extending pins 133 and 135 for transferring braking torque from the brake shoe 121 to the axially extending flanges 31 and 33 of the torque plate 21.

It can be appreciated from an inspection of FIGS. 4 and 5 that the caliper is chamfered at 147 and 149 to permit the spaced ears 137 and 139 of the backing plate 123 of brake shoe 121 and the spaced ears 105 and 107 of the backing plate 102 to extend through the space provided between surfaces 35 and 37 of the axially extending flanges 31 and 33, respectively, and the edges of the caliper 51 positioned adjacent thereto.

The backing plates 123 and 102 of the brake shoes 121 and 101, respectively, also have centrally positioned outwardly extending protuberances 151 and 153, respectively, that are engageable with complementary inwardly extending protuberances 155 and 157, respectively, on the caliper 51 to force the tabs 141 and 143 of the backing plate 123 into engagement with the axially extending flanges 31 and 33 of the torque plate 21 and to likewise force the tabs 109 and 111 of the backing plate 102 into engagement with these axially extending flanges.

The fluid motor portion 53 of the caliper 51 has a cylindrical bore 161 positioned therein for the reception of a piston 163 which has a closed end portion 165 engageable with the backing plate 102 of the brake shoe 101 during braking operations. A conventional O-ring seal 167 which is generally rectangular in cross section provides a seal between the cylinder 161 and a piston 163. Furthermore, a boot 171 joints the cylinder 161 and the piston 163 to prevent dirt and other contaminants from entering in the cylinder 161.

A hydraulic fluid inlet opening 175 is positioned to supply fluid under pressure to the piston 163 and a bleed line 177 is positioned in the cylinder to permit the draining of fluid from the rear of the cylinder when braking operations have been completed.

The fluid motor portion 53 of the caliper 51 also carries a hand brake actuating mechanism and an automatic brake adjustment mechanism which comprises a lever 201 rotatably mounted on a cross pin 203 that is positioned in bores 205 and 207 located in an outwardly extending annular housing 209. The actuating lever 201 has a cam surface 211 positioned in engagement with a cam follower surface 213 that forms the bottom of a groove 215 in the head 221 of a stud 223. The stud has a helical thread 225 positioned thereon with a low helix angle. A helical spring 227 engages the head 221 of the stud 223 and an end wall 229 formed in an enlarged bore 231 in the fluid motor portion 53 of the caliper 51. This spring urges the head 221 to the right, as shown in FIG. 2, so that the cam follower surface 213 of the head is urged into tight engagement with the cam surface 211 on the lever 201.

A threaded sleeve 233 has its outer portion slidably mounted in a bore 235 and an internally threaded portion 237 engaging the helical threaded portion 225 of the stud 223. The helical threads 225 on the stud 223 and the cooperating threads on the sleeve 237 may be cut so that counterclockwise rotation of the sleeve 233 relative to the stud 223 causes the sleeve 223 to be moved to the left relative to the stud 223 as viewed in FIG. 2. The sleeve 233 has an enlarged head 241 positioned in a bore 243 in the piston 163. An antifriction means in the form of a thrust bearing 245 has a ball race portion 244 engaging the underside 246 of the head portion 241 of the sleeve 233. This thrust bearing is mounted in the internal bore 243 of the piston 163 by means of a thrust washer 247.

When fluid under pressure is applied through the inlet 175 to the piston 163 during braking operations, the piston 163 is moved to the left, as viewed in FIG. 2. This moves the threaded sleeve 233 to the left via the thrust washer 247 and the thrust bearing 245. This movement, of course, causes relative rotation between the sleeve 233 and the threaded stud 223, since the sleeve 233 is free to rotate on the ball bearing race 244. During this action, fluid under pressure is, of course, applied to the head 241 of the sleeve, forcing it into tight engagement with the ball bearing race 244, since fluid under pressure will be present in the space between the left-hand surface of the head and the opposed inner wall of the piston. The movement of the sleeve 233 to the left causes the sleeve 233 to be unthreaded relative to the stud 223 thereby maintaining the relative spacing between the head 241 of the sleeve 233 and the opposed inner end wall of the piston 163. The stud 223, on the other hand, is prevented from rotation by the engagement of the cam 211 in the slot 215 which is held in position by the spring 227.

When braking operations have been completed and fluid under pressure is no longer supplied to the port 175, the various parts of the adjusting mechanism will remain in their same relative position, as took place during braking action. If the piston 163 should move slightly to the right, as viewed in FIG. 2, the spring force of the spring 227 will move the stud 223 and hence the sleeve 229 to the right, thereby maintaining the space between the head 241 and the opposed end wall of the piston at a constant value.

Thus, as the brake lining wears, the sleeve 233 will be unthreaded with respect to the threaded portion 225 of the stud 223, thereby progressively moving the piston 163 and the brake shoe 101 to the left as viewed in FIG. 2.

During hand brake operation, the lever 201 is rotated counterclockwise, as shown in FIG. 1, thereby forcing the stud 223 and the sleeve 233 to the left, as shown in FIG. 2, so that the head 241 of the sleeve 233 abuts the opposed surface of the piston 163. This moves the piston 163 to the left, as viewed in FIG. 2, thereby forcing the brake shoe 101 to the left and the brake lining 103 into engagement with the rotor face 115 of the rotatable disk 15, thereby accomplishing braking action. This is done, of course, against the bias of the helical spring 227 and it can be appreciated that with a small or low helix angle on the complementary threads 225 and 235 on the stud 223 and sleeve 233, that a locking force is produced between the stud 223 and the sleeve 233 to prevent relative rotation between them.

When the lever 201 is returned to its position shown in FIG. 1, the helical spring 227 will move the stud 223 and the sleeve 233 back to the position shown in FIG. 2, where the inner surface of the head 241 of the sleeve 233 is in engagement with the ball bearing race 243.

It can be appreciated that during either hand brake operation or hydraulic operation of the brake 10 of the present invention, the piston 163 will force the lining 103 of the brake shoe 101 into engagement with the face 115 of the rotor 121, and the reaction force of the hydraulic fluid or the forces generated in the mechanical system described above will move the caliper 51 to the right as shown in FIG. 2, so that the brake lining 125 is forced through the reaction force of the caliper into engagement with the face 129 of the rotatable disk 15. The braking torque, of course, is taken by the brake shoes 121 and 101 and is transferred to the stationary torque plate 21, as described above, in which the torque from the inner brake shoe 101 is transferred directly to the torque plate 21 and the torque from the brake shoe 121 is transferred partially to the torque plate 21 and partially to the reaction portion 55 of the caliper 51. The bosses 91 and 93 on the caliper 51 that are in engagement with the surfaces 35 and 37 of the axially extending flanges 31 and 33, respectively, of the torque plate 21, prevents twisting of the caliper 51 with respect to the torque plate 21 due to this braking action.

Thus, the present invention provides a compact and efficient disk brake of the sliding caliper type that includes an efficient and uncomplicated hand brake and automatic wear adjusting mechanism.

It is to be understood, of course, that although a preferred embodiment of the invention has been shown and described, various modifications, substitutions and additions may be made thereto without departing from the spirit of the invention.

What is claimed is:

1. A disk brake assembly for braking an associated rotary disk comprising a stationary member having a pair of spaced flanges extending in a substantially axial direction with respect to the axis of rotation of the associated disk and across its outer periphery, a first brake pad disposed on one side of the associated disk, a second brake pad disposed on the other side of the associated brake disk, each of said brake pads having a frictional lining adapted to engage the respective surface of the disk and a backing plate, each of said brake pads having a length less than the spacing between said flanges for insertion and removal of said brake pads into the space between said flanges in a substantially radial direction relative to the associated disk, each of said backing plates having outstanding tab means formed only at their radial outer periphery and at opposite ends thereof, each of said tab means being engaged with the radial outer surface of a respective one of said flanges for supporting said brake pads upon said flanges against radial inward movement with respect to the associated disk, a caliper assembly encircling the associated disk and juxtaposed to said brake pads, means carried by said caliper for actuating said brake pads into frictional engagement with the disk, means for supporting said caliper relative to said stationary member and against radial outward movement relative to said stationary member, and interengaging abutment means on said caliper and on said backing plates for holding said tabs in engagement with said flanges and for precluding radial outward movement of said brake pads relative to the associated disk.

2. A disk brake assembly as set forth in claim 1 further including interengaging abutment means on the backing plates and on the stationary member for transferring braking torque from the brake pads to said stationary member.

3. A disk brake assembly as set forth in claim 2 wherein the interengaging abutment means on the first brake pad and the stationary member comprises offset flange means formed on said stationary member adjacent the pair of spaced flanges, the interengaging abutment means on the other of the brake pads and the stationary member comprising shoulders on the backing plate of said second brake pad in engagement with facing shoulders defined by the spaced flanges of the stationary member.

4. A disk brake assembly as set forth in claim 1 wherein the caliper is supported for movement in an axial direction relative to the associated disk, the means for actuating the brake pads comprising a fluid motor engaged with the first brake pad, actuation of the fluid motor being effective to cause sliding movement of said caliper, said caliper having a reactive leg engaged with said second brake pad for actuating said second brake pad.

5. A disk brake assembly as set forth in claim 4 wherein the means for supporting the caliper for sliding movement further comprises flexible strap means affixed to the stationary member and to the caliper.

6. A disk brake assembly as set forth in claim 4 wherein the caliper is supported at least in part for its sliding movement by interengaging shoulders formed on said caliper and on the pair of spaced flanges.

7. A disk brake assembly as set forth in claim 6 further including means for transmitting at least a portion of the braking torque from each of the brake pads to the stationary member, at least a portion of the brake torque from one of said brake pads being transmitted also to the caliper.

References Cited
UNITED STATES PATENTS

| 3,185,263 | 5/1965 | Schanz et al. | 188—73 X |
| 3,260,332 | 7/1966 | Wells | 188—73 |
| 3,375,906 | 4/1968 | Hayes | 188—73 |

GEORGE E. A. HALVOSA, Primary Examiner